United States Patent
Herranen (10) Patent No.: US 6,752,320 B1
(45) Date of Patent: Jun. 22, 2004

(54) WIRELESS COMMUNICATION DEVICE CARD AND AN ANTENNA STRUCTURE

(75) Inventor: Timo Herranen, Viiala (FI)

(73) Assignee: Nokia Mobile Phones Ltd., Espoo (FI)

( * ) Notice: Subject to any disclaimer, the term of this patent is extended or adjusted under 35 U.S.C. 154(b) by 56 days.

(21) Appl. No.: 09/631,501

(22) Filed: Aug. 3, 2000

(30) Foreign Application Priority Data

Aug. 6, 1999 (FI) .................................................. 991683

(51) Int. Cl.$^7$ ............................................. G06K 19/06
(52) U.S. Cl. ..................................... 235/492; 343/702
(58) Field of Search ........................ 235/492; 343/702; 455/90, 89; 340/825.44

(56) References Cited

U.S. PATENT DOCUMENTS

| | | | | |
|---|---|---|---|---|
| 4,725,845 A | * | 2/1988 | Phillips | 343/702 |
| 5,361,061 A | | 11/1994 | Mays et al. | 340/825.44 |
| 5,628,055 A | | 5/1997 | Stein | 455/89 |
| 5,670,968 A | * | 9/1997 | Inanaga et al. | 343/702 |
| 5,764,191 A | * | 6/1998 | Tsuda | 343/702 |
| 5,809,115 A | | 9/1998 | Inkinen | 379/93.05 |
| 5,913,174 A | * | 6/1999 | Casarez et al. | 455/557 |
| 5,918,163 A | | 6/1999 | Rossi | 455/90 |
| 6,005,523 A | * | 12/1999 | Rudisill | 343/702 |
| 6,149,470 A | * | 11/2000 | Northey et al. | 439/698 |
| 6,172,645 B1 | * | 1/2001 | Hollander et al. | 343/700 MS |
| 6,259,418 B1 | * | 7/2001 | Jones et al. | 343/702 |
| 6,266,017 B1 | * | 7/2001 | Aldous | 343/702 |

FOREIGN PATENT DOCUMENTS

| | | |
|---|---|---|
| EP | 0735609 A1 | 2/1996 |
| EP | 0936694 A2 | 6/1999 |
| WO | WO 97/07557 | 2/1997 |
| WO | WO 97/49194 | 12/1997 |

* cited by examiner

Primary Examiner—Diane I. Lee
Assistant Examiner—Lisa M. Caputo
(74) Attorney, Agent, or Firm—Perman & Green, LLP (57) ABSTRACT

An expansion card, preferably a wireless communication device, which card is arranged to be fitted in the expansion card connection of an electronic device and which comprises a frame part. In the invention, the card is provided with an antenna rod structure comprising a first end equipped with an antenna part and a second end to be fitted movably inside said frame part, wherein said antenna part is arranged to be movable for inserting the antenna part in said card and for extending the first end outside said card. The arrangement of the invention for setting and guiding the antenna structure to different positions comprises locking means which comprise a position lever arranged to be deflected to the side direction and to return and arranged in a functional connection with designed lever guides, which lever guides are arranged upon inserting said antenna structure to deflect said position lever to a position which prevents the pushing out of said antenna structure, and is arranged upon pushing said antenna structure further inwards to allow the return of said position lever to a position which allows the pushing out of said antenna structure.

25 Claims, 7 Drawing Sheets

Fig. 1

PRIOR ART

WIRELESS COMMUNICATION DEVICE CARD AND AN ANTENNA STRUCTURE

The present invention relates to an expansion card. The invention relates also to a method in the manufacture of an expansion card. Moreover, the invention relates to an antenna structure which is arranged to be fitted in a wireless communication device card. Furthermore, the invention relates to an arrangement for a wireless communication device for setting an antenna structure and guiding it in different positions.

In wireless communication devices, such as mobile phones, antennas used for the transmission and reception of radio-frequency signals include e.g. a monopole antenna and a helix antenna, in a way known per se. The radio-frequency signals are transmitted between the radio part and the antenna of the wireless communication device by means of conventional wiring and connectors. The dimensioning of antennas depends e.g. on the frequency range of the radio-frequency signal to be used at the time. In view of the operation of the antenna, it is advantageous that it is placed in a free space outside a mobile station or a corresponding device. Thus, the antenna is located farther from components causing radio interference, such as integrated circuits (IC) and radio frequency (RF) circuits, and the structures of the device do not interfere with the radiation pattern of the antenna, wherein the reception of radio-frequency signals is more reliable, particularly in a weak signal field.

According to prior art, various electronic devices, such as portable personal computers (PC) are often equipped with an expansion card interface, to which a standardized expansion card can be connected. These expansion cards are intended to form a functional unit with the PC. The expansion cards may also contain radio parts of a wireless communication device with its antenna, wherein the PC can, by means of this wireless communication device card, communicate with other devices or with a communication network, e.g. the GSM network (Global System for Mobile Communication).

One known expansion card is the PC card complying with the PCMCIA standard (Personal Computer Memory Card International Association). The PCMCIA standard also defines the physical size of the PC card. The PC cards are fitted to be inserted fully inside the PC, but so-called extended PC cards can be longer than ordinary PC cards. These extended PC cards are placed partly outside the PC, wherein the thickness and design of the PC cards may vary in this part which typically also contains the antenna of the wireless communication device card.

Figure 1:
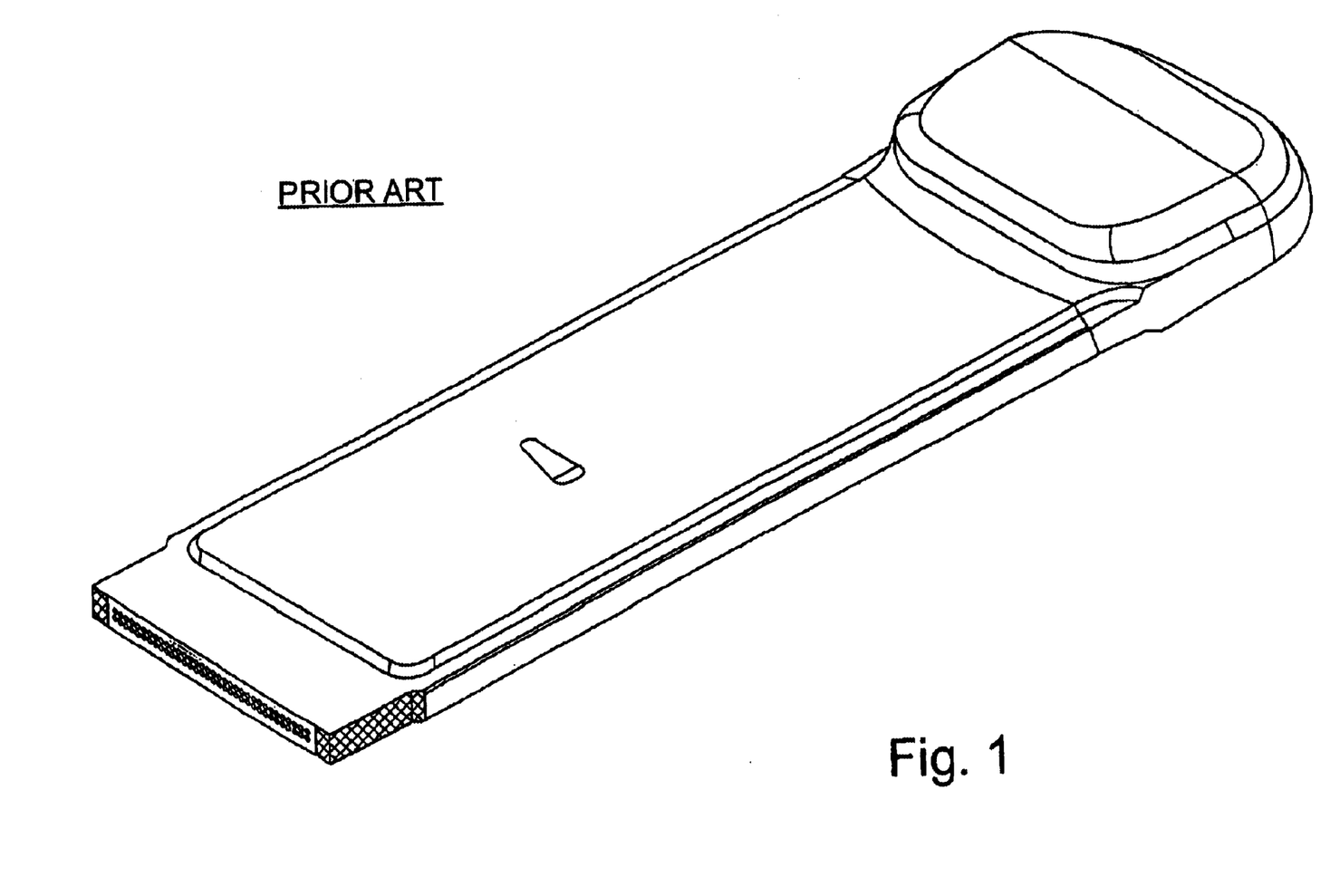
FIG. 1 is a perspective view showing a wireless communication device card according to prior art.

One known wireless communication device card which comprises a transceiver with its antenna is the Nokia Cellular Card Phone, i.e. a card phone that can be connected to expansion card interfaces of types II and III of the PC card complying with the PCMCIA standard. One embodiment of the card phone of prior art is shown in FIG. 1, and the operation of the card phone is described in more detail e.g. in patent publication U.S. Pat. No. 5,809,115. The card phone in question can comply with e.g. the GSM standard, wherein the PC device to which the card phone is connected can be in a wireless data transmission connection with base stations of a PLMN network (Public Land Mobile Network) by means of radio waves. In the card phone, the antenna part containing the antenna is placed in the part of the card phone located outside the PC device, and the antenna part is integrated with the card part of the card phone which is placed inside the expansion card connection. Other known wireless communication device cards are presented in patent publication U.S. Pat. No. 5,628,055, wherein a separate turnable antenna can be connected to the end of the card, and in U.S. Pat. No. 5,361,061, wherein a foldable antenna is pivoted at the end of the extended card on its upper surface. One wireless communication device card is also disclosed in the patent publication WO 97/49194, in which a card can be equipped with a separate fixed antenna part or, by means of a wire, a separate elongated antenna.

Other known expansion cards include e.g. a so-called CompactFlash (CP) card complying with the CFA standard (Compact Flash Association). For example for these CP cards, there are also adapters of the size of the PCMCIA card, in which the CP card is placed for the PCMCIA Interface. Also known are expansion cards for a wireless local area network (WLAN). Other expansion cards include also a so-called Miniature Card, whose size is only 38 mm×33 mm×3.5 mm, as well as a so-called SmartMedia card, whose size is only 45 mm×37 mm×0.76 mm, and an MMC card (so-called MultiMediaCard), whose size is only 32 mm×24 mm×1.4 mm.

One drawback in known communication device cards is the fact that during the use, particularly the antenna structure constitutes a part that protrudes from both the electronic device and the card. Moreover, the connections often comprise a protective cover to protect the expansion card, which must be kept open as the antenna structure extends outside the electronic device. The protruding parts of the antenna structure or of the card and protective covers may stick in something particularly during the transportation and use of the device, as well as they may damage the card or the antenna part. For this reason, the card must be detached after the use and be stored separately from the PC device for example during transportation; accordingly, a requirement for putting the device into working order is that the wireless communication device card is inserted back in its place.

It is an aim of the present invention to eliminate the above mentioned drawback and to present a considerable improvement to the prior art by means of a wireless communication device card according to the invention.

A wireless communication device card according to the invention, such as a card phone, has the considerable advantage that it can be made e.g. in the size of a PCMCIA card, wherein it fits fully inside e.g. the expansion card connection of a PC device. The wireless communication device card preferably constitutes an integrated unit with standardized dimensions, and thanks to a push in antenna, no protruding or separate carte will be formed in the structure of the card, wherein even an extended card will not comprise easily sticking or detachable elements.

The antenna structure of the invention can be placed, at least in its transportation position, fully inside the card, wherein the antenna structure to protected. Furthermore, it is an advantage of the spring operation that there is no need to provide the card or the antenna structure, particularly its end, with recesses, openings or extra parts for pulling the antenna out of the card, or to arrange closing devices or clamps for locking the antenna structure which would require space at the end of the card. Another advantage of the antenna structure is that its movement, thanks to the spring operation, can be arranged to be such that the antenna part is moved by its own force ready to its functional position at a correct distance from the device and from the card, wherein the user does not need to take care of pulling out the antenna part to this distance. Moreover, it is an advantage of the antenna structure that it can also be fitted in other wireless communication devices of prior art, such as mobile phones. As an integrated structure, the antenna structure can also be easily installed and changed.

The arrangement of the invention to control the different positions of the antenna structure makes it possible to couple the antenna structure to a wireless communication device, such as an expansion card, movably with a very simple and compact arrangement. A particular advantage is the thin construction, wherein the arrangement suits thin cards particularly well. An advantage of the arrangement is that it can be preferably applied for coupling antennas of different types movingly to a card. Thus, the arrangement can be coupled by means of intermediating parts e.g. to antenna parts placed fully outside the card and set in different positions, wherein the arrangement can be used to move the antenna part further from the card or to bring it closer to the card.

It is also an advantage that the presented arrangement leaves as much space as possible for the circuit board of the card and for the components placed thereon in the longitudinal direction and in the thickness direction of the card. A particular advantage is also achieved in that the end of the card, which is visible in the connection, has as wide an area as possible for connectors, the antenna part only taking space for its cross-section.

The wireless communication device card according to the invention does not need to be removed from the PC device for the time of transportation. Thus, the start-up of the PC device, the setting up of the radio connection, and the start of wireless communication become faster. At the same time also the acts of inserting and removing the card in and from the expansion card connection are decreased, wherein the wear of the connection is reduced, and malfunctions are decreased.

It is a particular advantage of the invention that the antenna is placed in a free area outside the device when it protrudes in its functional position. Thus, the antenna is located farther from the components causing radio interference, such as the processor of a computer. The influence of electromagnetic interference caused by the components decreases as the distance increases. It is possible that a sufficiently strong antenna structure in its functional position can be used for pulling out the card from the expansion card connection, wherein the device or the card do not need to be equipped with means or mechanisms facilitating the pulling out.

In the following, the invention will be described in more detail with reference to the appended drawings, in which.

Figure 2:
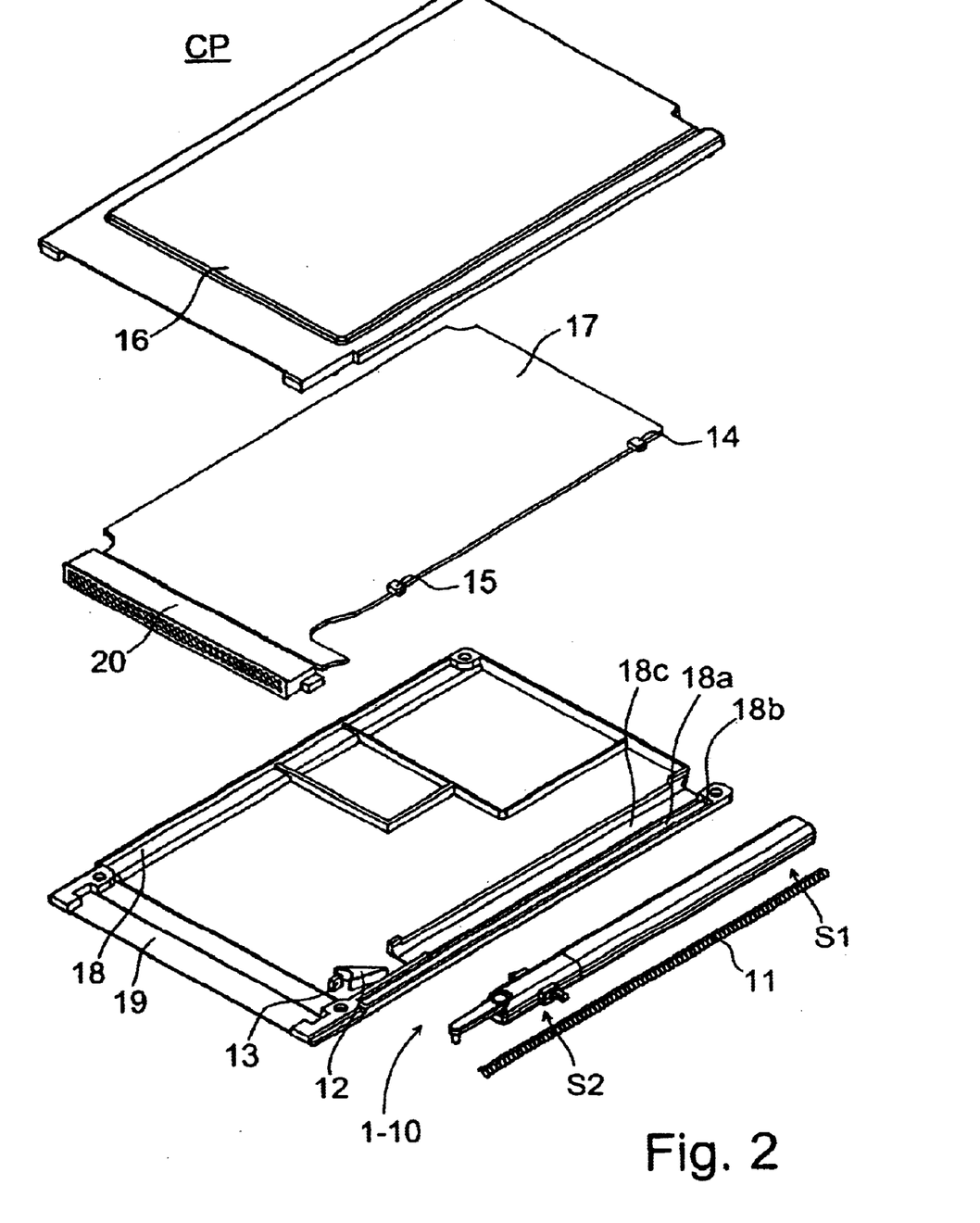
FIG. 2 is an explosion view showing a preferred embodiment of a wireless communication device card according to the invention.
Figure 4:
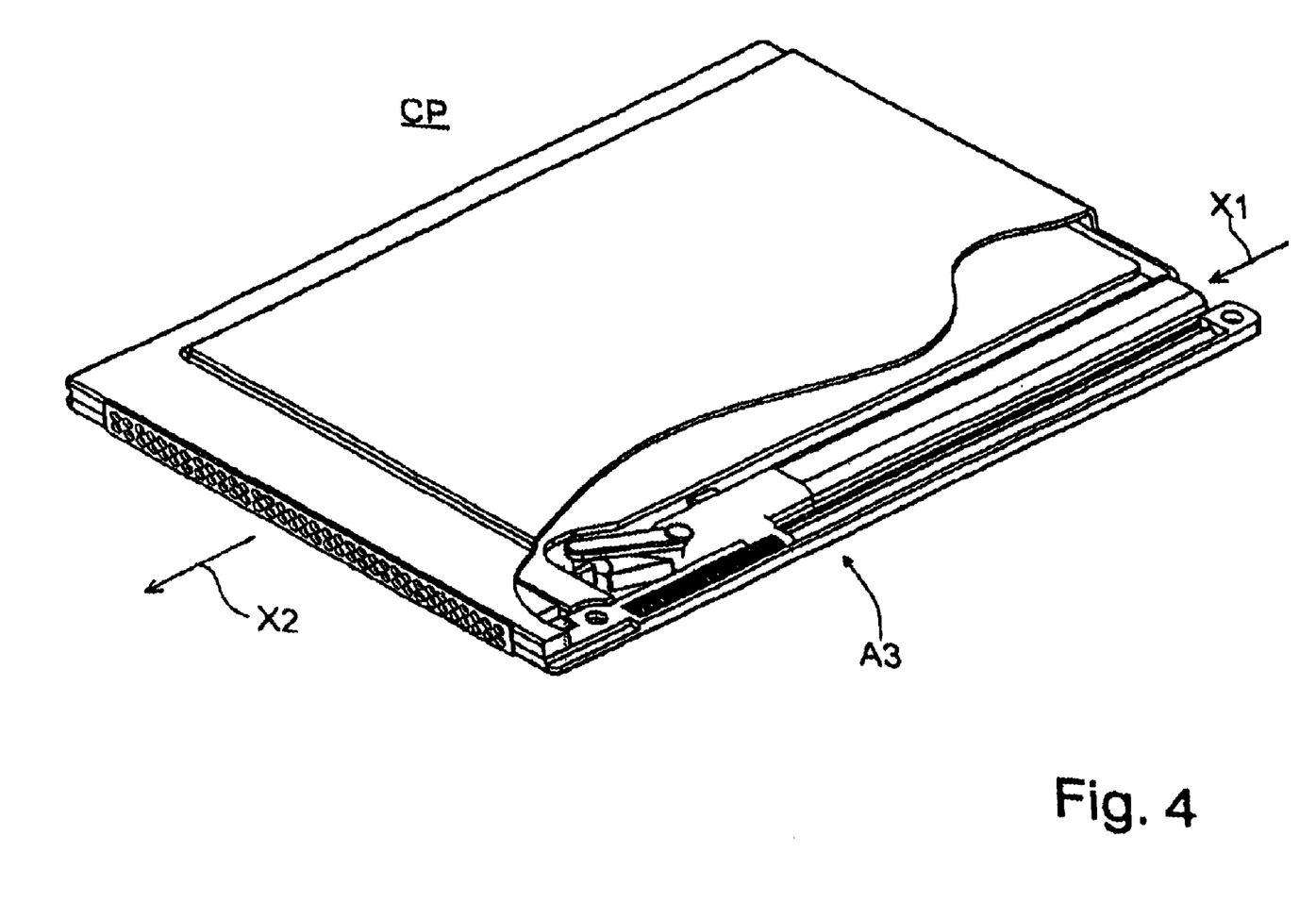
FIG. 4 is a perspective view showing a preferred embodiment of the wireless communication device card of FIG. 2 partly cut open and the antenna part shown in an intermediate position.
Figure 5:
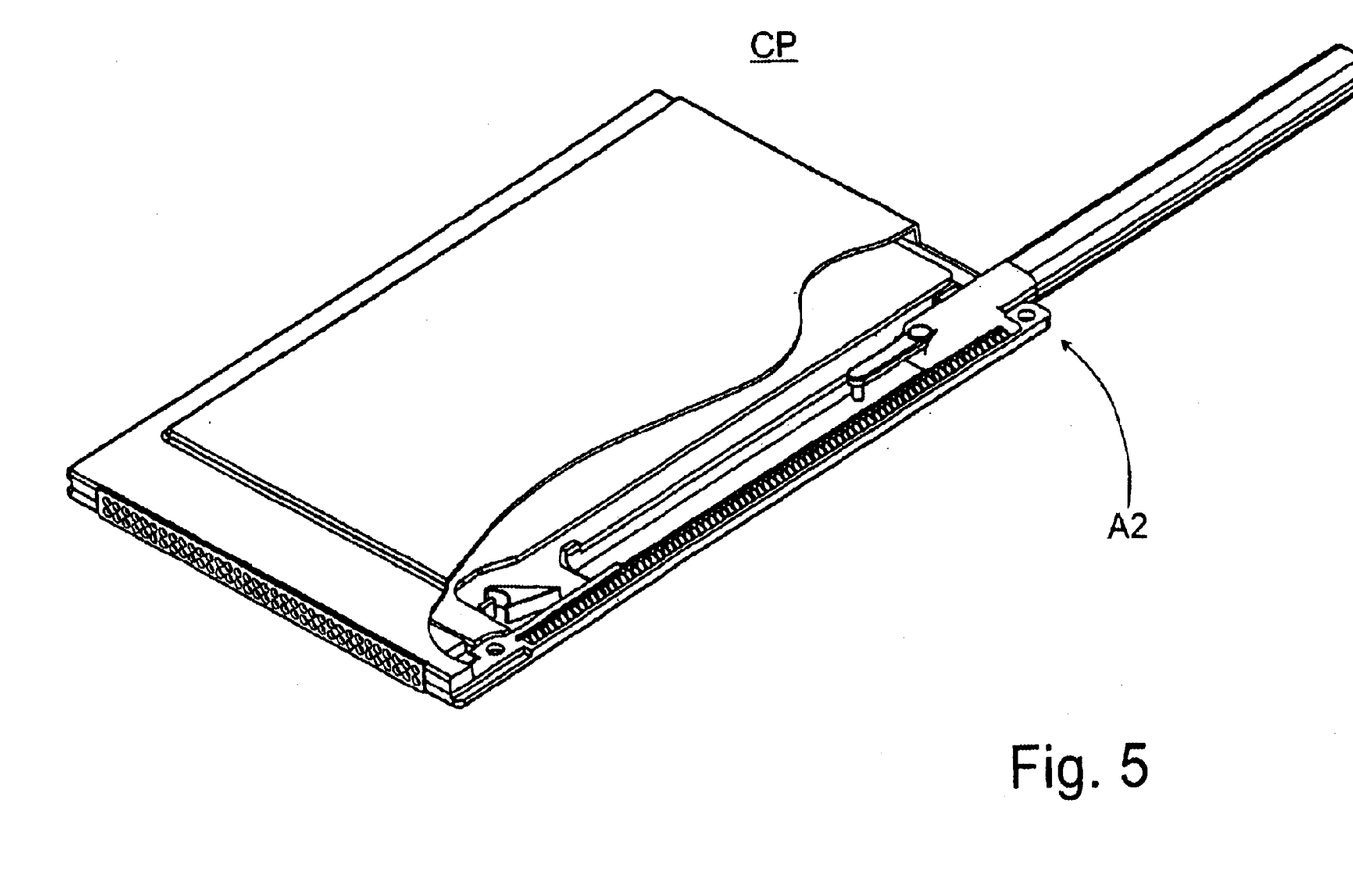
FIG. 5 is a perspective view showing a preferred embodiment of the wireless communication device card of FIG. 2 partly cut open and the antenna part shown in its functional position.
Figure 6:
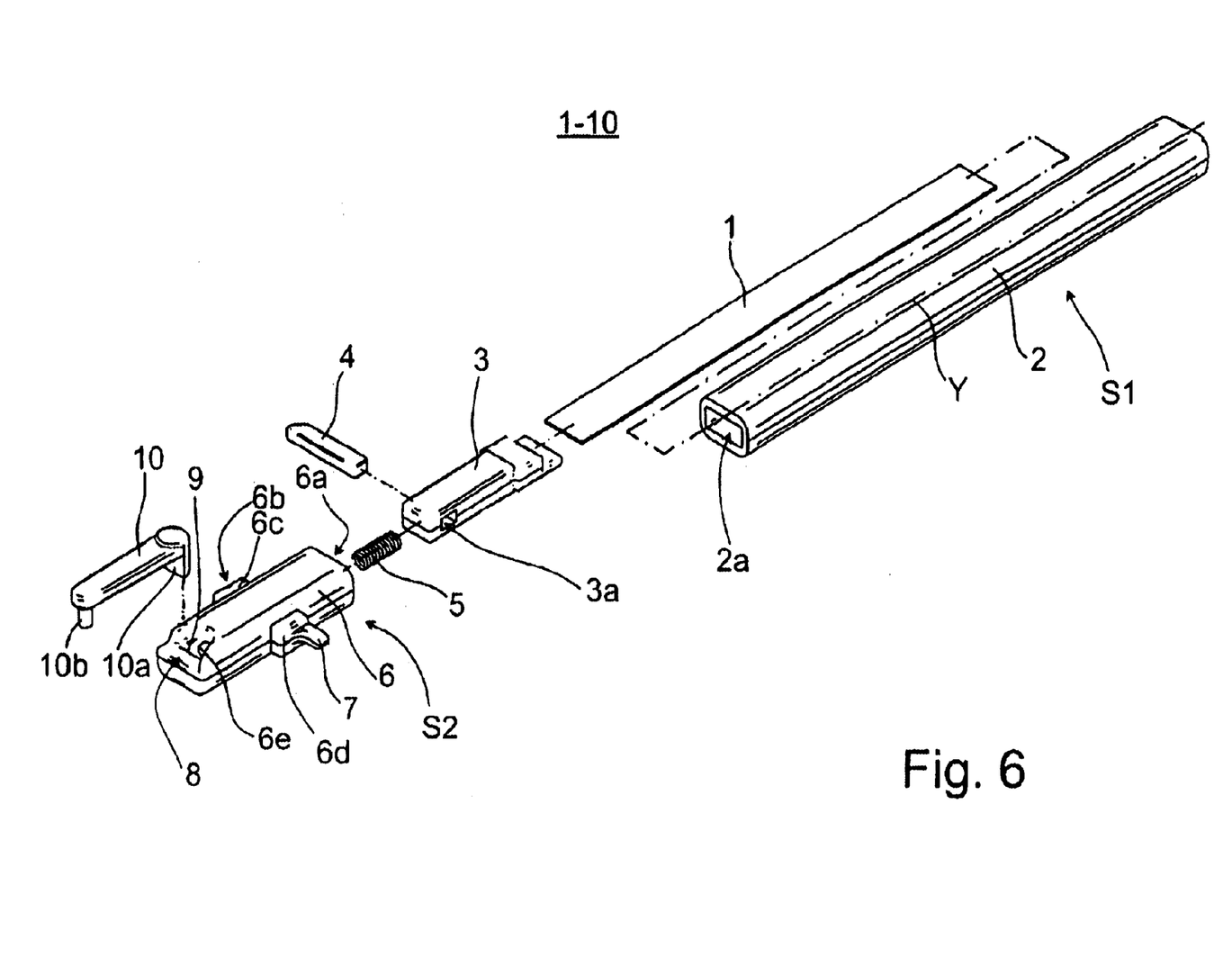
FIG. 6 is an explosion view showing a preferred embodiment of the wireless communication device card of FIG. 2.
Figure 7:
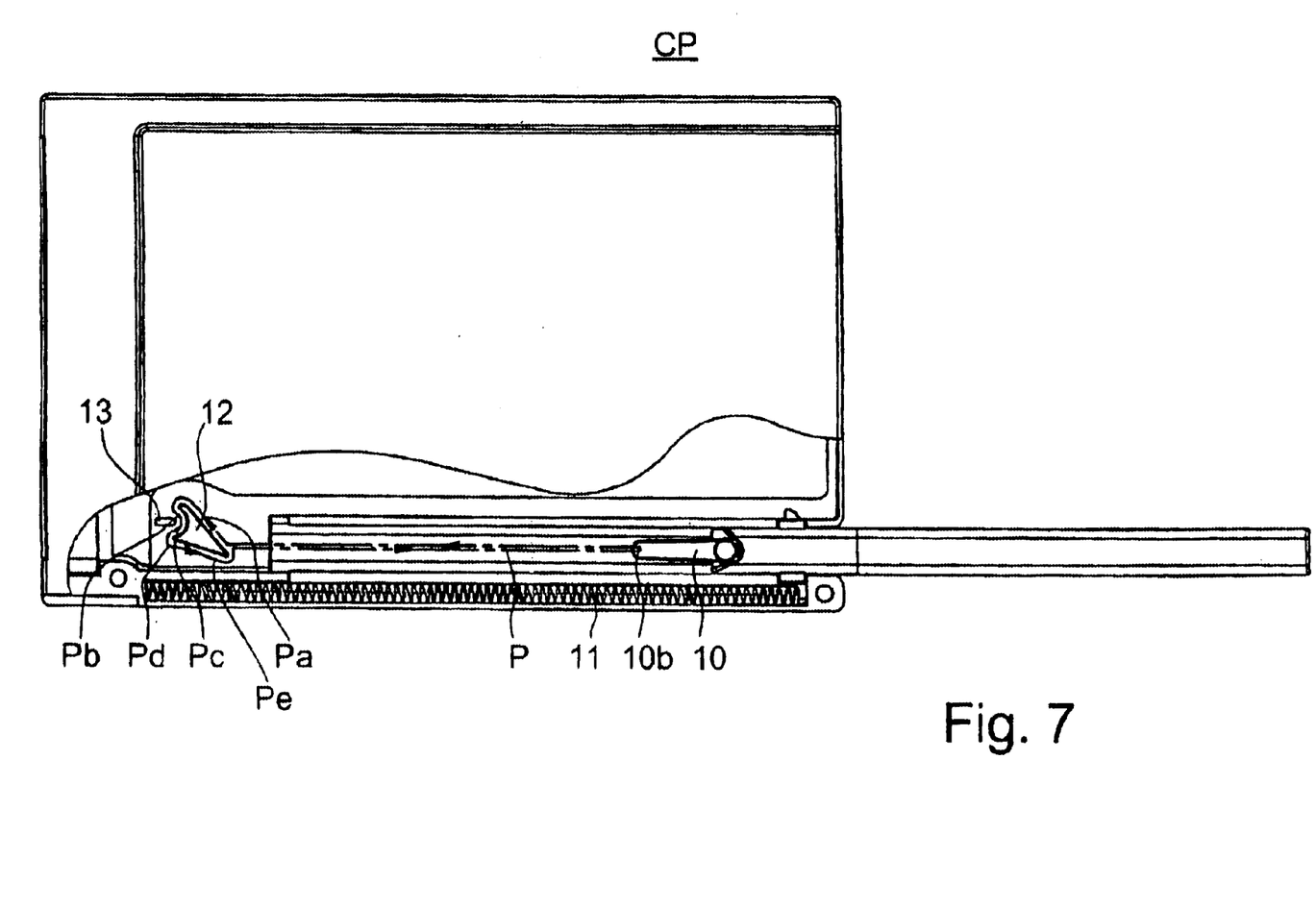
FIG. 7 is a basic view showing the principle of operation of the antenna part according to FIG. 6 seen from above.

With reference to FIGS. 2, 6 and 7, a wireless communication device card CP, which in the following will also be called a card CP, comprises a card frame part (comprising elements 16, 17, 18, 19 and 20) and an antenna structure 25. (comprising elements 1, 2, 3, 4, 5, 6, 7, 8, 9 and 10) fitted inside the same at least in its transportation position, a position mechanism (comprising elements 11, 12 and 13) for controlling the position of the antenna structure 25 and fitting it movably in connection with the frame part, and coupling means (comprising elements 14 and 15) for coupling the antenna structure 25, particularly its antenna part 1 electrically to the circuit board 17 of the frame part for the transmission of signals, such as radio signals. The antenna rod structure 25 comprises a first end 81, in connection with which the antenna part 1 is placed for receiving and transmitting signals in a wireless manner, and a second end S2 placed movably inside the card CP and equipped with coupling means 4 and locking means 5, 10, 12, 13 which shall be described further below. As shown in FIG. 2, the card CP comprises a first part, i.e. the frame part, and a second part, i.e. the antenna part 25, which parts are arranged to move in relation to each other in the longitudinal direction of the card CP (axis X) e.g. by means of the position mechanism. Thus, the moving can take place in this longitudinal direction X in a limited manner in both directions back and forth. The antenna structure can be moved into a first position A1 shown in FIG. 3, which in this description will be called the transportation position A1, a third position A3 shown in FIG. 4, which in this description will be called the intermediate position A3, and further to a second position A2 shown in FIG. 5, which in this description will be called the functional position A2. The radio parts of the card CP or the wireless communication device are located in the presented preferred embodiment of the invention in the frame part.

Further with reference to FIGS. 2 to 5, the card CP with the antenna structure 25 is designed as a PC card complying with the PCMCIA standard. Thus, the card CP has an axis X with a longitudinal length of 85.6 mm and a transverse length of 54 mm according to the PCMCIA standard. However, an extended PC card can be 40 mm longer than this. PC cards are divided into three types, wherein the thickness of the card CP in its middle part can be 3.3 mm (type I), 5.0 mm (type II) or 10.5 mm (type III). PC cards are designed to be inserted fully inside the expansion card connection by a movement in the direction of the longitudinal axis X of the PC card (arrow X2). The PC card is typically equipped with a 66-pin connector complying with the PCMCIA standard, by means of which the PC card is coupled to an electronic device, such as a PC. At the location of this connector and at the edge of the PC card the thickness of the PC card in 3.3 mm.

With reference to FIG. 2, the card CP normally comprises connector means 20 and frame means 18 which can be made of plastic, wherein the circuit board 17 of the card CP and the radio parts placed on the circuit board, such as a transceiver (not shown in the figures) are located inside the card CP. The cover structures 16 and 19 are usually planar and substantially equiform thin sheet structures, such as structures made of e.g. metal. As shown in FIG. 2, the card CP comprises a separate cover structure 16, but the cover structure 19 and the frame structure 18 constitute an integrated unit, where the unit can be made e.g. by casting. It is obvious that the frame structure 18 with its reinforcements can also be made separately and e.g. fixed to the cover structure 19.

The connector means 20 are fixed to a circuit board 17 placed inside the card CP. The circuit board 17 also comprises the components necessary for the functions of the card CP, such as integrated circuits (IC, not shown in the figures) and wirings (not shown in the figures) for the transmission of electric signals, such as radio signals, between the connector means 20 and the components. At the same time the circuit board 17, the components and wirings arranged on the circuit board 17, as well as the coupling means form the means for processing the signals, such as radio signals. Further, with reference to FIG. 2, the coupling means are needed for transferring the signals between the antenna structure 25 of the card CP and the components of the circuit board 17. The electronic operating principle of the wireless communication device card, such as a card phone as mentioned above, is known as such to anyone skilled in the art, wherein a more detailed description will not be necessary in this context.

Further with reference to FIG. 2, when the antenna structure 25 is fitted in the card CP and particularly in the desired positions of the antenna structure, such as in the positions A1 and A2, one must also take care of the coupling of the antenna signal and, if necessary, also of the coupling of the ground potential to the antenna part 1. The elongated antenna rod structure is also placed in alignment with the axis X and the direction of pushing (arrow X1 in FIG. 4), wherein the antenna structure is advantageously shorter than the card CP in order to fit inside the card CP. By using the connector means 20, the card CP is, for the transmission of signals, coupled to the expansion card connection of the PC device, which is equipped with pins which protrude in openings formed in the connector means 20 and having contacts whereby the pins are electrically coupled to the wirings and components of the circuit board 17. With respect to the connector means 20, the antenna structure is located on the next side of the card CP and arranged to extend from the opposite end outside the card CP, wherein when the card CP is fully inside the expansion card connection, the antenna structure can be moved by a pushing movement (arrow X1 in FIG. 4) out of the card CP and simultaneously out of the connection and farther from the electronic device. The antenna structure moves in the direction of the planes of the cover structures and protrudes from the card CP from between the cover structures and from a circumferential outer surface edging the card CP.

The card CP comprises a position mechanism operating in a spring manner for moving the antenna structure by pushing into the positions A1, A2 and A3 mentioned above. The position mechanism is arranged to release the antenna structure from the transportation position A1 to the intermediate position A3 and further to move and set it to the functional position A2, as well as to move the antenna structure from the functional position A2 to the intermediate position A3 and further back to the transportation position A1, to be locked. The pushing, which can be performed with e.g. with a finger, is performed in the direction compressing the pressure spring 11 of said mechanism (arrow X1 in FIG. 4). The transportation position A1 is substantially located between the functional position A2 and the intermediate position A3.

FIG. 6 shows a preferred embodiment of the antenna structure 25 comprising a rigid antenna rod housing 2, which can be made of e.g. plastic, and which is open at its one end, inside which the elongated, strip antenna part 1 is located to be shielded. The planar antenna part 1 can itself constitute the required antenna, or the surface of the strip antenna part 1 can be provided with a separate antenna element e.g. by means of a microstrip. The antenna part 1 is attached to a stake 3 which at its end on the side of the antenna part 1 is partly fitted inside the antenna housing 2, in an opening 2a, and at its opposite end is fitted inside a sleeve 6, in an opening 6a. The sleeve 6 constitutes an elongated housing structure which is preferably open at its one end. The antenna housing 2 and the sleeve 6 are fitted to adjoin each other, wherein their openings 2a and 6a face each other and the stake 3 fitted in said openings is fully placed inside them. The stake 3 can be fixed to the antenna housing 2 in various ways. The stake 3 is provided with a transverse opening 3a extending through the stake 3 and accommodating a transverse contact pin 4. The purpose of the contact pin 4 is to couple the antenna part 1 electrically to the circuit board 17 of FIG. 2. The sleeve 6 is provided with an opening 6b which extends in the transverse direction through its wall to the hollow inner part and which is arranged to receive the contact pin 4. Around the opening 6b, the sleeve 6 is provided with a collar part 6c supporting the contact pin 4. Fitted in the opening 6b, the contact pin 4 extends through the inner part of the sleeve 6 to the opposite wall which has a receptacle 6d supporting the end of the contact pin 4 of the receptacle 6d, only a protruding part extending outside the sleeve 6 is visible, which is also equipped with a protruding spring stopper 7 for the pressure spring 11 of FIG. 2 and for pushing the antenna structure 25 out of the card CP. Inside the sleeve 6 is arranged a pressure spring 5 which is fitted by compressing under the stake 3 and which pushes the stake 3 out of the sleeve 6. The stake 3 remains, however, inside the sleeve 6 when the contact pin 4 is fitted both in the opening 6b and in the opening 3a.

The closed, outermost end of the sleeve 6 is provided with a nest recess or opening 8 equipped with a planar surface 9 which is perpendicular to the longitudinal direction Y of the antenna structure 25 (which is parallel to the longitudinal direction X of the card CP). The planar surface 9 is fitted in the sleeve 6 in such a way that a position lever 10 can be supported against the planar surface 9, wherein the pressure spring 5 presses the position lever 10 placed between the spring 5 and the surface 9 against the planar surface 9. The pressure spring 5 is supported at its one end to the stake 3. The nest 8 also accommodates a transverse part which extends from the position lever 10 extending in the direction of the axis Y and which is equipped with a planar surface 10a. The nest 8 is arranged in such a way that it allows the pivoting of the position lever 10 in a side direction in a plane that is substantially parallel with the cover structure 16 of FIG. 2. A hole 6e extends from the nest 8 into the sleeve 6 to accommodate the spring 5. When the position lever 10 is turned, its planar surface 10 and the planar surface 9 are placed in an angle, but the pressure spring 5 tends to press the position lever 10 against the planar surface 9, which causes straightening of the position lever 10 and setting of the planar surfaces 9 and 10a in parallel to and against each other.

With reference to FIGS. 2 and 6, the side of the sleeve 6 is also equipped with a spring stopper 7 for the purpose of compressing the spring means fitted in the frame structure 18, such as a pressure spring 11, which is preferably a helical spring. For the pressure spring 11, the frame structure 18 is equipped with an elongated spring nest 18a in the direction of the antenna structure 25 (axis Y), to which the spring stopper 7 extends and in which the spring stopper 7 is movable. When the antenna structure is inserted in the card CP, also the pressure spring 11 is compressed and tends to push the antenna structure out of the card CP, wherein it generates a counter force for the insertion. The nest 18a is also equipped with an end stopper 18b which is hit by the spring stopper 7 and which prevents that the antenna structure is completely detached from the card CP. The frame structure 18 is also provided with an antenna nest 18c for the antenna structure 25, in which the antenna structure is allowed to move in the direction of the axis Y. The nest 18c is opened to the end of the card CP, from which the antenna structure is pushed out and thereby extends outside the card CP.

The function of the pressure spring 11 is to produce a force which is opposite to the direction of pressing (arrow X1 in FIG. 4), to move the antenna structure 25. Consequently, to move the antenna structure to different positions, preferably only a finger movement is required in the direction of pressing (arrow X1 in FIG. 4) and a pressing force for compressing the pressure spring 11, after which, when the finger is released, the antenna structure automatically springs out in the opposite direction.

As shown in FIG. 6, the outermost end of the position lever 10 in provided with a pin 10b for the purpose of moving along a path P shown in FIG. 7, under the guidance of lever guides 12 and 13 shown in FIG. 2 and formed in the frame structure 18 or alternatively fixed in the cover structure 19. Along the path P, the antenna structure is set in the different positions A1, A2 and A3. In the presented embodiment, the pin 10b, when straightened, is set parallel to the axis Y. It should be noted that the terms describing the different positions A1, A2, A3 (intermediate position, functional position, transportation position) are only given for illustrating the function and various positions of the antenna structure 25 and to separate the different positions from each other, and they do not describe the precise position of the antenna structure 25. How ever, for example the transportation position A1 is preferably the position in which the antenna structure is locked and placed fully inside the card CP. The location of the functional position A1 can vary even to a great extent, for example, depending on the location of the end stopper 18b, but in this position the antenna structure, particularly the antenna part 1 is located as far as possible from the frame parts of the card CP.

The antenna part 1 is electrically coupled to the circuit board 17 of the 5 card CP by means of the contact pin 4. The antenna part 1 is coupled to the contact pin 4 for example by means of wires or spring contact means (not shown in the figure), and the contact pin 4 can be made of an electroconductive material e.g. metal, or it can be coated with an electroconductive material. The ground potential possibly required by the antenna part 1 can be coupled in a variety of ways, e.g. through the stake 3 and the sleeve 7 and/or the antenna housing 2, wherein they must be equipped with electroconductive surfaces or contacts. In the functional position A2 of the antenna structure, the contact pin 4 is arranged in contact with the circuit board 17 with a contact spring 14 fitted according to FIG. 2, by means of which the antenna part 1 is electrically coupled to the wirings and components of the circuit board 17. When inserted, the connection between the contact pin 4 and the contact spring 14 is cut off. If necessary, the circuit board 17 can also be equipped with another contact spring 15, as shown in FIG. 2, in the location in which the contact pin 4 is set in the transportation position A1 of the antenna structure, wherein the antenna part 1 and the circuit board 17 have an electric contact to each other. It is obvious that the stake 3 can be equipped with several contact pins which are each electrically coupled to the circuit board by means of a contact spring. The contact springs and the way of their attachment can be different from that presented, and they can be, for example, elongated, slide means along which the contact pin 4 slides in the contact. It is also possible that the operation of the radio parts of the card CP is coupled on and off depending on the position of the antenna structure 1, or on the contact spring to which the antenna part 1 is coupled. For example, the operation is turned off in the first position A1 and turned on in the second position A2.

It is possible that the antenna structure, particularly the antenna part 1 and the antenna housing 2 are also arranged to be telescopically operated in the longitudinal direction of the card CP (arrow X), wherein e.g. slide elements are utilized in the electric coupling. It is also feasible that the antenna housing 2 is equipped with a joint by means of which the antenna housing 2 can be turned in the functional position of the antenna part 1 to be perpendicular to the card CP, e.g. to a vertical position. However, for inserting the antenna structure 1, the antenna housing 2 must first be straightened.

The lever guide 12 comprises a triangular structure to be fitted on the longitudinal axis Y and in a functional connection with the pin 10b of the position lever 10, one tip of the triangle diagonally pointing at the antenna structure. The sides next to the tip are preferably planar, and the aide opposite to the tip is formed as a concave surface. Close to said concave surface is also arranged the second lever guide 13 which guides the pin 10b to follow said concave surface with a curvilinear movement and which prevents the lever 10 from being straightened to be parallel with the antenna part i in the intermediate position. The pressure spring 5, the position lever 10, and the lever guides 12 and 13, which are all arranged in a functional connection with each other, constitute the locking means which form an arrangement for setting and guiding the antenna structures in the different positions, particularly by a movement of a spring means, such as the pressure spring 11. The arrangement can be utilized in connection with various antenna structures, wherein for example by extending the stake 3, the antenna part 1 with the antenna housing 2 can be placed fully outside the wireless communication device. The antenna part 1 can also be fixed to the stake 3 also in the perpendicular direction, wherein the attachment of the antenna part 1 and the antenna housing 2 to the stake 3 can be arranged in such a way that pivoting around the longitudinal direction into the different positions is possible. Naturally, it is obvious that in said arrangement, the attachment of the stake 3 and the sleeve 6 as well as the antenna part to the arrangement can be different from that presented. It is also obvious that the assembly of the antenna structure itself can also vary from that presented and may comprise e.g. means for processing signals and several connecting means.

With reference to FIGS. 6 and 7, we shall now look into the operation of the position mechanism. FIG. 7 shows a path P which is particularly followed by the pin 10b of the lever 10. The antenna structure 25 moves back and forth in its longitudinal direction in the card CP (arrow Y), and also the pin 10b is primarily in the straightened position, pushed by the pressure spring 5 of FIG. 5. When the antenna structure is inserted in the card CP, the pin 10b is set in a functional connection with the lever guides 12 and 13 which guide the position lever 10 by deflecting it from the rest position maintained by the spring 5 into different positions. By means of said positions, oleo the antenna structure is set in the positions A1, A2 and A3 mentioned above. When the antenna structure in inserted from the functional position A2 of FIGS. 5 and 7, the lever guide 12 guides the pin 10b to the side (groove Pa), until the pin 10b passes the edge of the guide and tends to be straightened, i.e. to be returned to its rest position, by means of the spring force. However, the straightening is prevented by the lever guide 23 which is hit by the pin 10b which remains in a slanted position (location Pb). Thus, the antenna structure is set in its intermediate position A3, shown in FIG. 4, which is not permanent but the antenna structure is moved from its intermediate position A3 to the transportation position A1. The antenna structure does not remain locked in its intermediate position A3 which is only used as an intermediate phase required for moving the position mechanism into different positions. The pin 10b is arranged to move past the lever guide 13 in the perpendicular direction only between the lever guides 12 and 13, for example by preventing insertion of the antenna structure too far in the card CP, or by the design of the lever guide 13.

Figure 3:
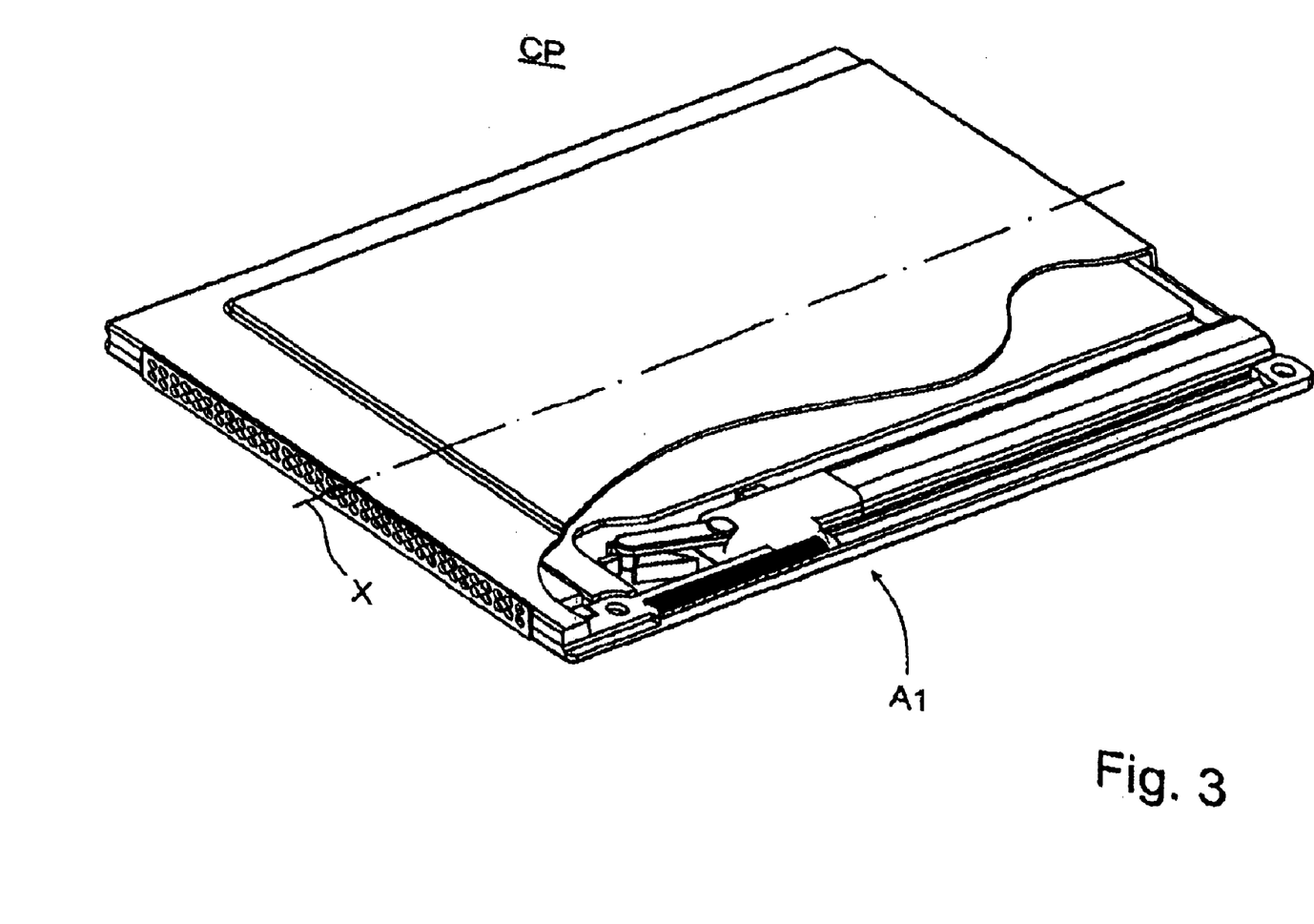
FIG. 3 is a perspective view showing a preferred embodiment of the wireless communication device card of FIG. 2 partly cut open and the antenna part shown in its transportation position.

When the antenna structure is released, e.g. by stopping the insertion with a finger and releasing the first end S1, the pressure spring 11 pushes the antenna structure out from the card CP, wherein also the pin 10a is moved to the concave part of the lever guide 12 (groove Pc), at the bottom of which the pin 10b is set, pushed by the spring 11, behind the lever guide 12 when seen from the antenna structure. Thus, the antenna structure is set in its transportation position A3 as shown in FIG. 3. When the antenna structure is inserted again, e.g. by pushing the first end S1 with a finger, the pin 10b can continue to follow the curvilinear part of the lever guide 12 and at the same time the position lever 10 tends to be straightened by the spring force of the spring 5, until the pin 10b passes the edge of the lever guide 12 (location Pd), moving past the lever guide 12 in the perpendicular direction, and the position lever 10 can be straightened. Thus, the pressure spring 11 is allowed to push the antenna structure out from the card CP, without being prevented by the position lever 10, particularly the pin 10b.

During the pushing out, the edge of the lever guide 12 guides (groove Pe) the pin 10b to the side, deflecting it past the tip of the lever guide 12 pointing at the antenna structure, so that the straightened and restored position lever 10 would hit the other side (groove Pa) of the lever guide 12 during the insertion.

According to a second embodiment of the invention, the antenna structure 25 and the position mechanism are arranged in such a way that the pressure spring 5, the nest 8 and the planar surface 9 are fitted to a location in which the parts 12 and 13 are found in FIG. 2. In a corresponding manner, the lever guides 12 and 13 are thus fitted in the sleeve 6 and the position lever 10 is fitted in the nest 8. Thus, the position of said parts is also turned 180 degrees around the direction perpendicular to the direction Y. Furthermore, it is obvious that in comparison with the second embodiment and the first embodiment of FIG. 2, the position of said parts can also be turned around the direction Y, for example 90 or 180 degrees, wherein the lever guides 12, 13 can also be attached to the cover structure 16. The lever guides 12, 13 can also be arranged to be fixed to the circuit board 17. In FIG. 2, the antenna structure is placed to the right-hand side of the card CP, but its position can also be on the left-hand aide of the card, where also another corresponding antenna structure can be placed. It is obvious that the antenna structure can also be placed in the middle part of the card CP; however, this will make the internal structure of the card CP more complicated.

It is obvious that the invention is not limited solely to some preferred embodiments of the invention as presented above, but it may vary within the scope of the claims. For example, it is obvious that in the invention, the antenna part can also be brought fully inside or only closer to the wireless communication device, and that in the invention the antenna part can be brought out of or only farther from the wireless communication device.

What is claimed is:

1. An expansion card, wherein the card is arranged to be fitted in an expansion card connection of an electronic device, such as a data processor, and which card comprises a frame part, wherein the card is provided with an antenna structure which is a rod structure comprising a first end and a second end, the first end for receiving and transmitting signals, and the second end of the rod structure being adapted to be placed movably inside said frame part so that the second end moves in relation to the frame, wherein said antenna structure is arranged to be movable by inserting the first end of the antenna structure into an interior of the frame of said card and extending the first end outside the frame, and wherein the antenna structure comprises a contact pin for electrically connecting the antenna structure to a circuit board when the contact pin makes electrical contact with a first contact spring on the circuit board.

2. The expansion card according to claim 1, wherein it is a wireless communication device card, wherein said frame part is provided with means for processing signals, and that the second end of said antenna structure is provided with connecting means for transferring signals between said antenna structure and said means for processing signals.

3. The expansion card according to claim 1, wherein it is formed at least partly as a card complying with a standard, such as the PCMCIA standard, being preferably 85.6 mm long, preferably 54 mm wide, and preferably not more than 3.3 mm, 5.0 mm or 10.5 mm thick.

4. The expansion card according to claim 1, wherein the frame part comprises connector means for connecting said card electrically to said expansion card connection, wherein the antenna structure is arranged to be pushed out at the opposite end of said card with respect to said connector means.

5. The expansion card according to claim 1, wherein said antenna structure is arranged to be pushed out by a spring means fitted inside said card.

6. The expansion card according to claim 1, wherein said antenna structure is arranged to be locked at its first position, by first inserting it by pushing it inwards, further than its first position, wherein locking is activated, and then releasing it and allowing it to move back to its first position, in which said antenna structure is, preferably entirely, inside said card, and that said antenna structure is arranged to move from the first position to its second position by first pushing said antenna structure inwards, further than its first position, and then releasing it, wherein locking is deactivated, and allowing it to move back past its first position and stop at its second position, wherein in the second position said antenna structure extends, preferably as far as possible, outside said card.

7. The expansion card according to claim 6, wherein said antenna structure is arranged to be locked in its position by means of locking means fitted in connection with the second end, which locking means comprise a pivoting position lever arranged to be deflected sideways and back again and arranged to be guided by lever guides, which lever guides are arranged upon inserting said antenna structure to deflect said position lever to a position which prevents the pushing out of said antenna structure and thereby activating locking, and are arranged upon pushing said antenna structure further inwards to allow the return of said position lever to a position which allows the pushing out of said antenna structure and thereby activating locking.

8. The expansion card according to claim 7, wherein said lever guides comprise at least a first part which comprises side surfaces arranged to be followed by a pin fitted in said position lever and behind which said pin is arranged to be set when being deflected at the same time, and also a second part which is arranged to keep said pin, which has passed the first part, deflected and to guide it behind the first part for activating locking.

9. The expansion card according to claim 7, wherein said position lever is arranged at the second end of said antenna structure, and that said lever guides are fitted in a fixed manner inside said frame part.

10. The expansion card according to claim 1, wherein said antenna structure is movable in a direction parallel to a longitudinal direction of the antenna structure while being inserted in the card and while being extended outside the card.

11. The expansion card according to claim 1, wherein the second end of the antenna structure is arranged to be movable for bringing said antenna structure partly or fully inside said frame part, and farther away from an exterior of said frame part.

12. The expansion card according to claim 1, wherein the contact pin is adapted to make electrical contact with the first contact spring when said antenna structure is extended.

13. The expansion card according to claim 12, wherein the contact pin is adapted to make electrical contact with a second contact spring on the circuit board when said antenna structure is inserted.

14. A method in the manufacture of an expansion card wherein the card is arranged to be fitted in the expansion card connection of an electronic device, such as a data processor, and which card comprises a frame part, wherein the card is provided with an antenna structure which is a rod structure comprising a first end and a second end, the first end provided with an antenna part for receiving and transmitting signals, and the second end of the rod structure adapted to be placed movably inside said frame part so that the second end moves in relation to the frame, wherein said antenna structure is arranged to be movable relative to the frame part of said card by the first end being adapted to be retracted into an interior of said frame part and the first end being adapted to be extended outside said frame part of said card.

15. An antenna structure which is arranged to be fitted in a wireless communication device, wherein the device comprises a frame part provided with means for processing signals, wherein said antenna structure is a rod structure comprising a first end and a second end, the first end being provided with an antenna part for receiving and transmitting signals, and the second end being adapted to be placed movably inside said frame part so that the second end is movable in relation to the frame, and which is provided with connecting means for transferring signals between said antenna structure and said means, wherein said antenna structure is arranged to be movable relative to said frame part of the wireless communication device by inserting the first end of the antenna structure into said wireless communication device and extending the first end outside said wireless communication device, and wherein the antenna structure comprises a contact pin for electrically connecting the antenna structure to a circuit board when the contact pin makes electrical contact with a first contact spring on the circuit board.

16. The antenna structure according to claim 15, wherein it is arranged to be pushed out by a spring means fitted inside said frame part.

17. The antenna structure according to claim 15, wherein it is arranged to be locked in its position with locking means fitted in connection with the second end, which locking means comprise a pivoting position lever arranged to be deflected sideways and back again and arranged to be guided by lever guides, which lever guides are arranged upon inserting said antenna structure to deflect said position lever to a position which prevents the pushing out of said antenna structure and thereby activating locking, and are arranged upon pushing said antenna structure further inwards to allow the return of said position lever to a position which allows the pushing out of said antenna structure and thereby activating locking.

18. The antenna structure according to claim 17 wherein said position lever is arranged at the second end of said antenna structure and that said lever guides are arranged in a stationary manner inside said frame part.

19. An arrangement for a wireless communication device, such as a mobile phone or an expansion card, for setting and guiding an antenna structure in different positions,
wherein said antenna structure comprises a first end which is provided with an antenna part for receiving and transmitting signals, and a second end to be fitted movably inside said wireless communication device,
wherein the arrangement comprises a spring means to be fitted inside said wireless communication device, for pushing out said antenna structure,
wherein the arrangement comprises locking means for setting said antenna structure in its first position, which locking means comprise a pivoting position lever arranged to be deflected sideways and back again and arranged to be guided by lever guides, which lever guides are arranged upon inserting said antenna structure by pushing it inwards to deflect said position lever to a position which prevents the pushing out of said antenna structure, wherein locking is activated, and which lever guides are arranged upon pushing said antenna structure inwards, further than its first position, wherein locking is de-activated, to allow the return of said position lever to a position which allows the pushing out of said antenna structure to its second position, and
wherein the first position is arranged for bringing the antenna part to the inside of or closer to said wireless communication device and the second position is arranged for bringing the antenna part out of or farther from said wireless communication device; and
wherein the arrangement comprises a contact pin on the antenna structure for electrically connecting the antenna structure to a circuit hoard when the contact pin makes electrical contact with a first contact spring on the circuit board the first contact spring corresponding to the second position.

20. The arrangement according to claim 19, wherein said position lever is fitted at the second end of said antenna structure and that said lever guides are integrated in said wireless communication device.

21. The arrangement according to claim 20, wherein a longitudinal direction of the antenna structure is parallel to a longitudinal direction of the card.

22. The arrangement according to claim 20, wherein said antenna structure is fully insertable inside the card.

23. The arrangement of claim 19 further comprising a second contact spring on the circuit board adapted to establish an electrical connection between the antenna structure board and the circuit board when the contact pin contacts the contact spring in the first position.

24. An antenna structure which is arranged to be fitted in a wireless communication device, wherein the device comprises a frame part provided with means for processing signals:

wherein said antenna structure is a rod structure comprising a first end and a second end, the first end being provided with an antenna part for receiving and transmitting signals, and the second end being adapted to be placed movably inside said frame part so that the second end is movable in relation to the frame, and which is provided with connecting means for transferring signals between said antenna structure and said means;

wherein said antenna structure is arranged to be movable relative to said frame part of the wireless communication device by inserting the first end of the antenna structure into said wireless communication device and extending the first end outside said wireless communication device; and wherein said antenna structure is arranged to be locked in its position with locking means fitted in connection with the second end, which locking means comprise a spring-operated pivoting position lever having a rest position maintained by a spring and arranged to be deflected sideways and back again and arranged to be guided by lever guides, which lever guides are arranged upon inserting said antenna structure to deflect said position lever from the rest position to a position which prevents the pushing out of said antenna structure when said antenna structure is again released and thereby activating locking, and are arranged upon pushing said antenna structure further inwards to allow the return of said position lever to a position which allows the pushing out of said antenna structure and said position lever to restore the spring-maintained rest position when said antenna structure is again released and thereby deactivating locking.

25. The arrangement according to claim 24, wherein said position lever is fitted at the second end of said antenna structure and that said lever guides are integrated in said wireless communication device.

* * * * *

UNITED STATES PATENT AND TRADEMARK OFFICE
CERTIFICATE OF CORRECTION

PATENT NO. : 6,752,320 B1
DATED : June 22, 2004
INVENTOR(S) : Timo Herranen

It is certified that error appears in the above-identified patent and that said Letters Patent is hereby corrected as shown below:

Title page,
Item [30], Foreign Application Priority Data, "991683" should be -- 19991683 --

Column 10,
Line 27, "wide," should be -- wide --
Line 41, "it" should be -- it, --

Column 11,
Line 27, "card" should be -- card, --

Signed and Sealed this

Thirtieth Day of November, 2004

JON W. DUDAS
*Director of the United States Patent and Trademark Office*